Sept. 20, 1955  J. W. PALM  2,718,293
OVERCENTER CAM TYPE CLUTCH
Filed Dec. 6, 1952  2 Sheets-Sheet 1
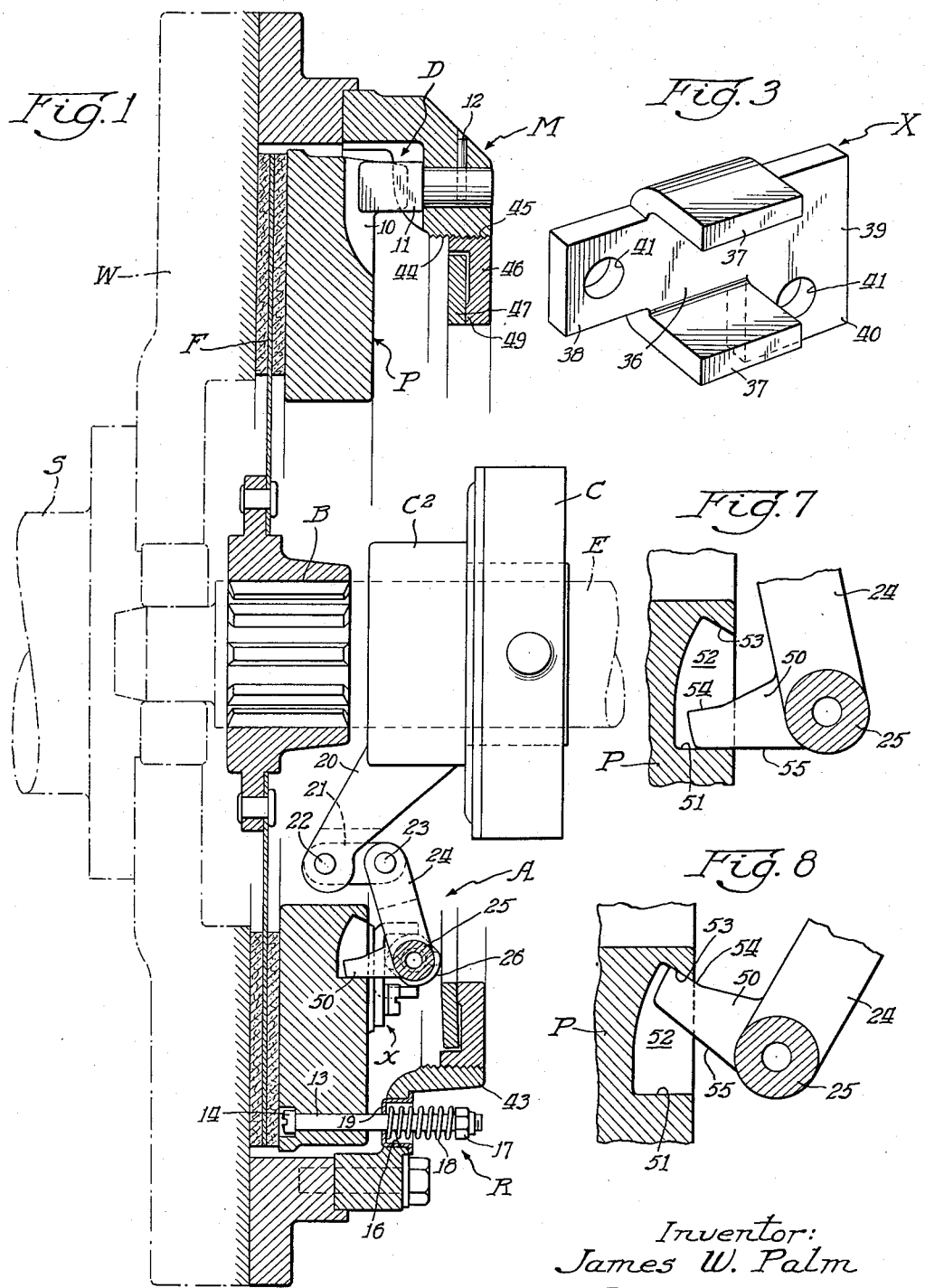
Inventor:
James W. Palm Sept. 20, 1955      J. W. PALM      2,718,293
OVERCENTER CAM TYPE CLUTCH
Filed Dec. 6, 1952      2 Sheets-Sheet 2
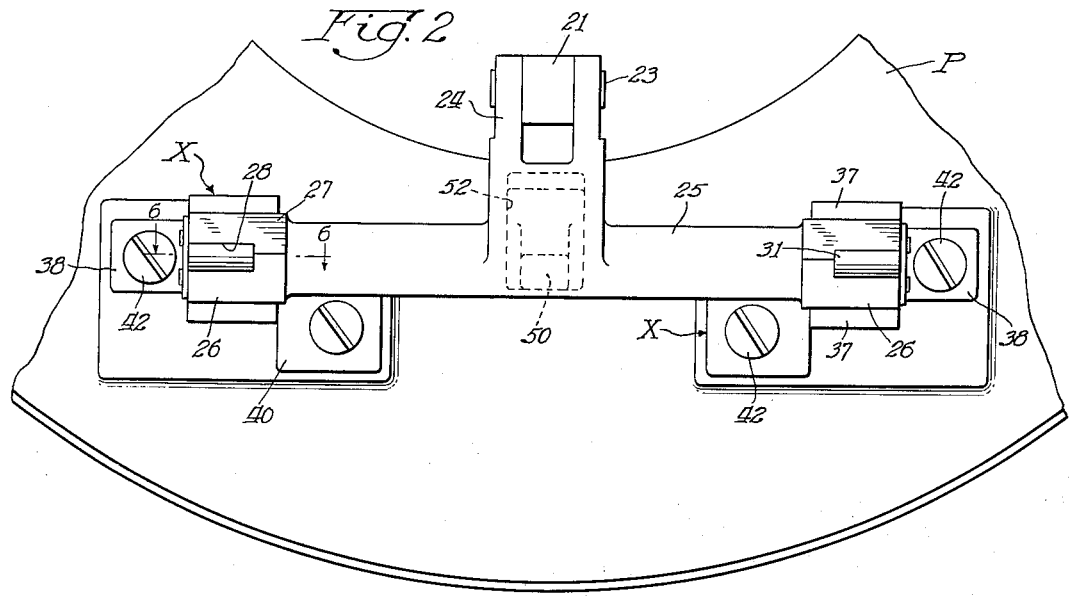
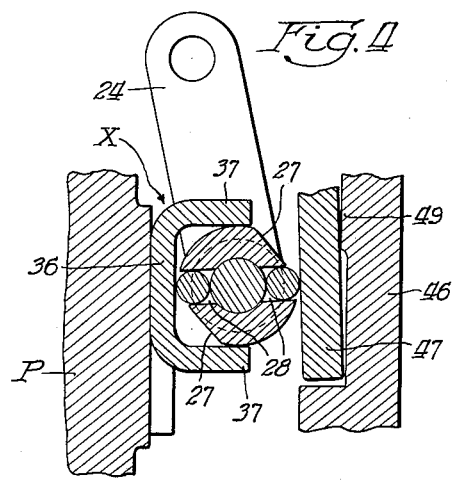
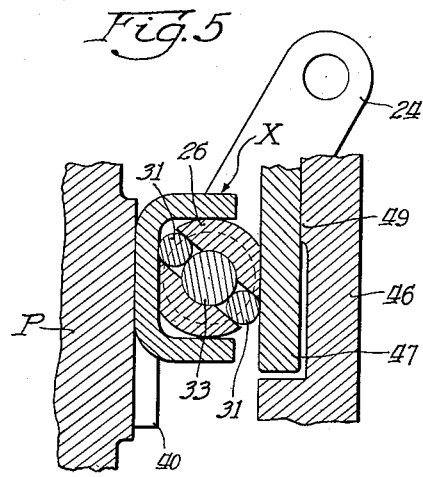
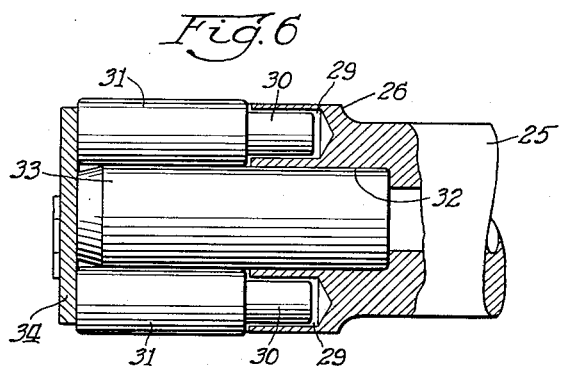
Inventor:
James W. Palm

# United States Patent Office 2,718,293
Patented Sept. 20, 1955

2,718,293

OVERCENTER CAM TYPE CLUTCH

James W. Palm, Rockford, Ill., assignor to Borg-Warner Corporation, Chicago, Ill., a corporation of Illinois Application December 6, 1952, Serial No. 324,494

6 Claims. (Cl. 192—93)

The present invention relates generally to friction clutches preferably of the overcenter type, and has particular reference to an arrangement for mounting or journaling the cam members to which rotary reciprocal movements are imparted for successively engaging and releasing the clutch elements.

In clutch assembly disclosed in Ruesenberg et al. Patent No. 2,129,361 granted September 6, 1938, the means for operating the clutch members comprise a rockshaft or rod having cam elements at opposite ends which are journaled in spaced pairs of bearing lugs formed integral with and project rearward from the back surface of the cast iron pressure plate. This is illustrative of a well-known prior practice as embodied in clutches produced by current manufacturers.

In an arrangement such as disclosed in the above-mentioned Ruesenberg patent, the heat which is generated in the clutch elements, particularly in the pressure plate, migrates directly to these cast iron journaling lugs causing the grease or other lubricant to liquefy, with the result that the rollers mounted within the cams lose their lubrication and said rollers and lugs soon show wear due to rubbing action between the respective parts. Also, it is frequently noted that small particles of the cast iron sluff from the surfaces of these unlubricated parts and will enter the bearings which are provided within the cams for the rollers, so that the operation of these rollers, as well as the cam bodies are seriously impaired.

In addition to the foregoing objections, tests have disclosed that "brinelling" occurs on the cast metal lug surfaces as well as surfaces of adjacent parts. This is due to the extreme pressures which have been exerted by the cams for effecting engagement and release of the clutch elements. This "brinelling" factor, plus the before-mentioned rubbing-wear factor, of course interferes with the efficient operation of the cam rollers to such an extent that it is necessary to frequently adjust the travel of the cam operating levers to compensate for variations in the critical tolerances thereof in order to provide correct release and engagement movements of the elements in the clutch assembly. This, of course, is a time-consuming and expensive job.

For the purpose of overcoming wear it has heretofore been the prior practice to provide a hardened metal insert member in the bottom of the cam bearing between the lugs cast on the pressure plate, said insert member being engaged by the adjacent roller in the cam cylinder. This, of course, requires the additional operation of machining a groove or channel in the surface of the pressure plate and then fitting this metal insert therein, as well as the cast metal bearing lugs disclosed in the before-mentioned Ruesenberg patent. It will be apparent that the present clutch arrangement avoids the use of this prior metal insert by employing a sheet metal cradle structure wherein the cam rollers are adapted to operate against the hard surface of the sheet metal body or plate portion of the cradle between the cam journaling ears on the cradle member.

The present improvements, therefore, have been designed with the view of overcoming the above-described inherent objections to supporting the cam members and rod in journaling or bearing lugs which are formed integral with the cast iron pressure plate. To this end the present improvements provide an arrangement in the form of a structurally independent cradle device which is made wholly of sheet metal and carried by and attached to the pressure plate. The cradle has upstanding ears to receive between them the cam members at the ends of the rock shaft which is suitably operated to effect clutch engagement or release. These cradle devices are separately attached to the back or rear surface of the pressure plate by bolts passing through portions of the body plate of the cradle and are threaded into the pressure plate to permit ready removal or replacement.

The assembly comprising the present invention during extensive experimentation and tests have established the fact that a major portion of the wear on the cam bearings, as well as on the cams themselves and the bearings therein for the rollers, is practically eliminated. Also, it is apparent that in the event wear actually takes place, it is a simple matter to detach the cradles and replace them with spare parts without the necessity of removing or replacing the entire pressure plate member which at best is a laborious and time consuming job. Furthermore, it is unnecessary to employ a hardened metal insert as heretofore for the reason that the cam roller in the present assembly will operate on the hard surfaces of the ears on the cradles attached to the pressure plate.

An object of the present invention is to provide a clutch assembly, more particularly of the overcenter type, wherein there are cam devices for operating the clutch elements and said cam devices are journaled in improved and novel bearings on the pressure plate, and these bearings are constructed and arranged in a manner so that wear, which has heretofore been incident to the operation of said cams, is considerably eliminated.

Another object of the present improvements is to provide an overcenter clutch assembly with novel cams and journaling means which preferably takes the form of cradle elements defined by sheet metal members with integral bearing ears for the cams. In this arrangement the cradles are readily accessible for removal and replacement, and the laborious job of removing and replacing the entire pressure plate is avoided.

In clutch assemblies where the pressure plate has cam bearing lugs cast integral therewith it sometimes occurs, when the pressure plate is roughly handled by a mechanic during the assembling operation at the factory, that a lug may be broken off and the entire pressure plate must be discarded. This, of course, is entirely avoided with the present novel improvements for the reason that a bearing cradle with a damaged lug may be quickly replaced with another sheet metal bearing plate without scraping the entire pressure plate.

Furthermore, it is not necessary for a service station or automobile repair shop to carry in stock several pressure plates having differently spaced journaling lugs to accommodate cam elements of different diameters, which of course occupies considerable storage space. Likewise, it is unnecessary to take the time and labor to grind off the opposing bearing surfaces of a pair of cast metal lugs to accommodate different diameters of cam members. The present structurally independent plates are capable of being made having a variety of standard spacing between the opposing surfaces of the bearing ears on the cradle members.

Another feature of the present arrangement resides in the provision of means to effect a positive breakaway or withdrawal of the pressure plate from its clutch-engaged position in order to supplement the retractor springs usually employed for moving the pressure plate axially rearward. In large industrial or heavy duty clutches where high pressure is exerted on the pressure plate to effect a firm contact between the plate, the friction disc and the flywheel, it sometimes occurs that the pressure plate will adhere to the disc notwithstanding the pull exerted by the retractor springs. Also, in the event there is a rupture of the retractor springs or they become fatigued, the force of these springs is insufficient to properly withdraw the pressure plate.

It is therefore an object of the present improvements to provide means for positively withdrawing the pressure plate in an axial direction to disengage the clutch and thereby assist in this rearward axial movement of the pressure plate which is normally effected by the retractor springs. This is accomplished in the present structure by providing a nose or lug member on the cam shaft and having a portion which is adapted to engage an aligned stop on the pressure plate in a manner so that the nose or lug acts as a retractor for the pressure plate. It will be noted that both the nose and the stop are provided with cuts or surfaces which are complemental to each other so that when the cam shaft is rotated the force exerted thereby will act against the stop to withdraw the pressure plate and effect a positive breakaway. Also in clutch released position the stop and nose are cooperatively related in a manner to act as a lock which retains the pressure plate in an inoperative position respecting the flywheel and friction disc when the clutch assembly is disengaged.

Additional objects, aims and advantages of the invention contemplated herein will be apparent to persons skilled in the art after the construction and operation of the improved and efficient clutch arrangement is understood from the within description. It is preferred to accomplish the numerous objects thereof and to practice this invention in substantially the manner hereinafter fully described and as more particularly pointed out in the appended claims. Reference is now made to the accompanying drawings that form a part of the specification.

In the drawings:

Fig. 1 is an axial section of a clutch assembly made in accordance with and incorporating the present improvements;

Fig. 2 is a fragmental view looking at the rear of the clutch pressure plate to show the cam and its mounting arrangement;

Fig. 3 is a perspective view of a cam journaling cradle;

Fig. 4 is a side elevation, partly in section, showing the cradle with the cam in an operative or clutch engaged position;

Fig. 5 is a view similar to Fig. 4 showing the positions of the parts when the clutch is disengaged;

Fig. 6 is an axial section on line 6—6 of Fig. 2.

Fig. 7 is a diagrammatic view showing positions of portions of the clutch operating assembly when the clutch has been engaged; and Fig. 8 is a view similar to Fig. 7 showing the positions assumed by the parts when the clutch is in released position.

The drawings are to be understood as being more or less of a diagrammatic character for the purpose of disclosing a typical or preferred form of the novel improvements contemplated herein, and in these drawings like reference characters identify the same parts in the different views.

The clutch structure which is exemplified by the drawings comprises generally the rotatable flywheel W attached to the adjacent end of the engine crank shaft S and carries an annular back assembly M which has a driving connection as at D with the annular cast metal pressure plate P that is normally urged in a rearward axial direction by the retractor assembly R. The pressure plate, as is the usual practice, is shiftable towards and away from the flywheel W, and in the overcenter type of clutches this shifting function is performed by the clutch operating assembly A, the operation of which causes the pressure plate to engage the driven friction disc F and urges the latter into engagement with the flywheel. The driven friction disc F is splined as at B on the driven shaft E to permit its axial movement to and from the flywheel, and said pressure plate through the medium of the clutch operating assembly A, has a connection with the shift collar C which includes a sleeve portion C2 which is mounted for slidable movement on the driven shaft E. The foregoing instrumentalities of the clutch assembly will now be described in detail.

The rear face of the pressure plate P has notches 10 therein to receive pins 11 projecting axially from the adjacent region from the back assembly M, said pins being held in place by suitable lock devices 12. This permits the pressure plate to be shifted axially and also to rotate in unison with the clutch driving members, including the flywheel and the back assembly, for the purpose of driving the friction disc F when the pressure plate has been shifted forwardly to clamp the disc against the flywheel. When the clutch operating assembly is actuated to release the pressure plate, the latter is normally withdrawn from the disc F and flywheel W by the retractor assembly R which comprises a bolt 13 the shank of which passes through the pressure plate and the head 14 of which is seated in a recess in the inner or forward face of the pressure plate. The rear end region of the bolt 13 protrudes through an aperture 16 in the adjacent portion of the back assembly or cover M and is threaded to receive an adjusting nut 17. A coiled spring 18 surrounds the shank of this bolt between the adjusting nut 17 and a flanged sheet metal cup 19 seated in the portion of the radial wall of the back assembly through which the bolt passes. It will be understood that the tension spring 18 normally acts in a manner to move the pressure plate P into its clutch released position when the shift collar C has been moved in an axially rearward direction to release the clutch.

Movement of the shift collar C on the driven shaft E is effective to actuate the clutch operating assembly A in either direction axially on the driven shaft E, and to accomplish this function this assembly A is operatively connected to said shift collar by the linkage devices disclosed in Fig. 1. As illustrated, the collar sleeve C2 has arms 20 extending forwardly in a generally radial direction and the outer extremities of these arms receive the adjacent end of the link 21 which is pivotally connected thereto by pin 22, and the opposite end of said link is pivotally connected by pin 23 to the adjacent radially inner end of a lever arm 24 projecting from the mid-region of a rock shaft or bar 25. The end regions of this rock are enlarged to provide generally cylindrical cams 26 which are journaled in cradle devices carried by the pressure plate and identified generally as X. The outer cylindrical surfaces of the cams have diametrically located flat regions 27 and where these regions merge into the cylindrical surfaces of the cams there are elongated apertures 28, 28. Joining these apertures are axially extending inner bores 29, 29 to receive the reduced shanks 30 of rollers 31. A central or axial bore 32 which receives an intermediate or central roller 33 which has frictional contact with the rollers 31 and the ends of the cam members 26 are closed by a suitable plate or disc 34 to prevent longitudinal movement of the rollers. As shown, the arcuate surfaces of the small rollers 31 protrude slightly beyond the cylindrical surfaces of the cam bodies 26 and the arrangement of the rollers 31 and 33 is such that the smaller rollers 31 will both rotate in the same direction when they are engaged with adjacent portions of the clutch assembly. The cylindrical surfaces of the cam are arranged to contact opposing bearing surfaces of the journaling cradle during rotation of the rock shaft 25.

In lieu of the usual hardened metal insert which heretofore has been seated in the inner portions of the cast iron bearing lugs on the pressure plate, the present improvements contemplate the use of the sheet metal cradles X, one of which is illustrated in detail in Fig. 3. As shown, the cradle structure comprises a plate or body portion 36 having upstanding ears 37, 37 at two opposite edges, and said body is extended in one direction from these ears to provide a flat attaching lug 38. At the other side of the ears 37 the plate body extends in a direction opposite to lug 38 as at 39 and has a projecting angular portion defining a lateral lug 40 which is disposed substantially at a right angle to the body portion 36. It will be understood that the body 36, the lugs 38 and 40 and the extension 39 are all in a common plane so that these portions will lie flat against the rear surface of the pressure plate. The lugs 38 and 40 have suitable apertures 41 to receive attaching bolts 42 which pass through these apertures and are threaded into tapped sockets or threaded bores in the pressure plate for securing the cradles in proper position on the plate for receiving and journaling the cam bodies 26 at the ends of the rock shaft 25.

The back member M has an irregular shape in cross-section and a rear portion thereof has an axially extending annular wall or flange 43 the internal surface of which has threads 44 which are engaged by the threads 45 on the outer surface of an adjusting ring 46. By rotating this adjusting ring 46 a spring ring 47 carried thereby will be shifted axially toward the pressure plate and thereby will take up wear which may have occurred in some of the parts of the clutch assembly. There is an annular shoulder or boss 49 on the face of the adjusting ring 46 next to the spring ring 47 to provide a fulcrum for the spring ring 47 near the inner region thereof. The cams are adapted to act against the adjacent or forward surface of the spring ring in a plane radially outward from the boss 49 and will yieldably distort this ring into a frustum-conic shape in cross-section when the cam rollers 31, 31 have made contact respectively with the cradle body 36 on the pressure plate and the spring ring 47.

As hereinbefore mentioned, difficulty may be experienced in securing a breakaway of the pressure plate when the clutch is being released. This is particularly notable in overcenter clutches of the heavy duty type, such as used in tractors and similar vehicles where the clutch may remain in its engaged position for a considerable period of time. Means have been provided in the present improvement for insuring a positive breakaway of the pressure plate, such means being in addition to the torsion usually exerted by the retractor spring assembly. Furthermore, in the event of fatigue or rupture of the retractor spring it is necessary to provide for this emergency through the means of positively acting devices to insure release of the clutch. As shown, in the enlarged detail in Figs. 7 and 8, the rock bar 25 has a lateral lug or nose portion 50 which projects toward the pressure plate P and is approximately perpendicular to the axis of said rock bar. This nose is arranged to coact with a stop which is defined by an axially extending surface 51 within a notch or recess 52 made in the rearward surface of the pressure plate. Opposite the surface 51 the recess has a second surface 53 which is complementary to a surface 54 on the nose 50. Fig. 7 shows the relative positions of these parts when the clutch is in engaged position and it will be noted that the edge 55 of the nose is engaged with the surface 51 thereby to arrest rotative movement of the rock bar immediately after the cam devices have been moved to the overcenter positions shown in Fig. 4. When the clutch operator assembly A is shifted in a direction to release the clutch, the nose 50 travels arcuately upward in the recess 52 until its surface 54 comes into contact with the oblique or slanting surface 53 to the position shown in Fig. 8. During this travel of the nose 50 the pressure plate will have been released and the retractor assembly is sufficient, under ordinary conditions, to withdraw the pressure plate.

In the event the driven disc inadvertently adheres to the flywheel and the pressure plate, upon further rotative movement of the rock shaft 25, the surface 54 of the nose will tend to slide in an upward and rearward direction on recess surface 53 toward the inner corner thus exerting a rearward releasing force against the pressure plate. After the pressure plate has been withdrawn from the clutch engaged position the nose 50, by reason of being engaged against the surface 53, is effective to hold the pressure plate against involuntary axial movement.

What is claimed is:

1. A clutch of the overcenter type comprising rotatable clutch elements one of which is axially movable to effect clutch engagement and release; a cam operable to overcenter position to shift said axially movable clutch element into engagement with an adjacent clutch element; and means for mounting and actuating said cam comprising a rock member attached to said cam; and a cradle member carried by said axially movable clutch element and defined by a one-piece structurally independent metal plate secured to the rear surface of said movable clutch element; upstanding parallel ears at opposite portions of said plate for engagement by diametrically opposite sides of said cam for journaling said rock member; and attaching lugs extending from spaced edges of said plate and lying against the rear face of said axially movable clutch element and anchored in assembly therewith.

2. A clutch of the overcenter type comprising rotatable clutch elements one of which is axially movable to effect clutch engagement and release; a cam operable to overcenter position to shift said axially movable clutch element into engagement with an adjacent clutch element; and means for mounting and actuating said cam comprising a cradle member carried by said axially movable clutch element and defined by a structurally independent metal plate secured to the rear surface of said movable clutch element, said plate having a generally L-shape contour defining an elongate rectangular body and a lateral arm at an end region of said body; upstanding parallel ears at opposite side edges of said body at the juncture thereof with said lateral arm and arranged for engagement with diametrically opposite sides of said cam, the region of said body beyond said ears and said lateral arm providing spaced apertured lugs for attachment to said axially movable clutch element; and means for imparting rotary reciprocatory movement to said cam.

3. In a clutch assembly an axially fixed back member; a pressure plate axially shiftable with respect to said back member; and means for moving said pressure plate in an axial direction comprising a cam journaled on said pressure plate and acting between said plate and said back member for normally shifting said plate in a direction away from said back member; rotatable means for turning said cam in one direction to effect axial movement of said pressure plate thereby to engage the clutch assembly; means defining a recess on said pressure plate; and a lug on said rotatable means adapted to enter said recess during movement of said rotatable means in a reverse direction, said recess and lug having obliquely inclined surfaces thereon which are complementary to each other whereby engagement of said surfaces is effective to move said pressure plate towards said back member.

4. In a clutch assembly an axially fixed back member; a pressure plate axially shiftable with respect to said back member; retractor means normally urging said pressure plate in a direction towards said back member; a cam journaled on said pressure plate and acting between said plate and said back member for normally shifting said plate in a direction away from said back member in opposition to said retractor means; rotatable means for turning said cam in one direction to effect axial movement of said pressure plate thereby to engage the clutch assembly and in a reverse direction to release the clutch assembly; means defining a recess on said pressure plate; and a lug on said rotatable means adapted to enter said recess during said reverse movement of said rotatable means, said recess and lug having obliquely inclined surfaces thereon which are complementary to each other whereby engagement of said surfaces is effective to assist said retractor means to move said pressure plate towards said back member and also to retain said pressure plate in said last-mentioned position.

5. In a friction clutch of the over-center type having an axially shiftable pressure plate; cam means operable to shift said pressure plate; and a rock shaft supporting and actuating said cam means; and a cradle on said pressure plate for journaling said rock shaft, comprising an elongate sheet metal plate having a rectangular mid region lying against said pressure plate; spaced parallel ears extending perpendicular to said mid region at the upper and lower margins thereof to receive said rock shaft; a first apertured attaching lug extending horizontally from one end of said mid region beyond said ears; and a second apertured attaching lug extending from the opposite end of said mid region having greater vertical length than the distance between said spaced ears thereby to position its aperture in a plane offset with respect to and below the plane of the lower ear.

6. In a friction clutch wherein the axially shiftable pressure plate is moved by a cam on a rock shaft; and a cradle on the pressure plate for journaling the rock shaft, comprising a sheet metal member of L-shape defined by an elongate body and a pendant arm and having apertures at the lower end of said arm and at the opposite end of said body; and spaced parallel ears extending perpendicular to the plane of said body along the upper and lower margins thereto and lying between said apertures for receiving an adjacent portion of said rock shaft.

References Cited in the file of this patent
UNITED STATES PATENTS

| | | |
|---|---|---|
| 1,294,800 | Hawley | Feb. 18, 1919 |
| 1,300,831 | Ferguson | Apr. 15, 1919 |
| 1,306,302 | Cooper | June 10, 1919 |
| 2,129,361 | Ruesenberg et al. | Sept. 6, 1938 |
| 2,277,610 | Ruesenberg | Mar. 24, 1942 |